July 19, 1949. W. E. URSCHEL 2,476,336
APPARATUS FOR CUTTING THE TOPS FROM BEETS
Filed April 8, 1943 6 Sheets-Sheet 1

INVENTOR.
William E. Urschel
BY Loftus, Moore, Olson & Trexler
ATTORNEYS.

July 19, 1949. W. E. URSCHEL 2,476,336
APPARATUS FOR CUTTING THE TOPS FROM BEETS
Filed April 8, 1943 6 Sheets-Sheet 2
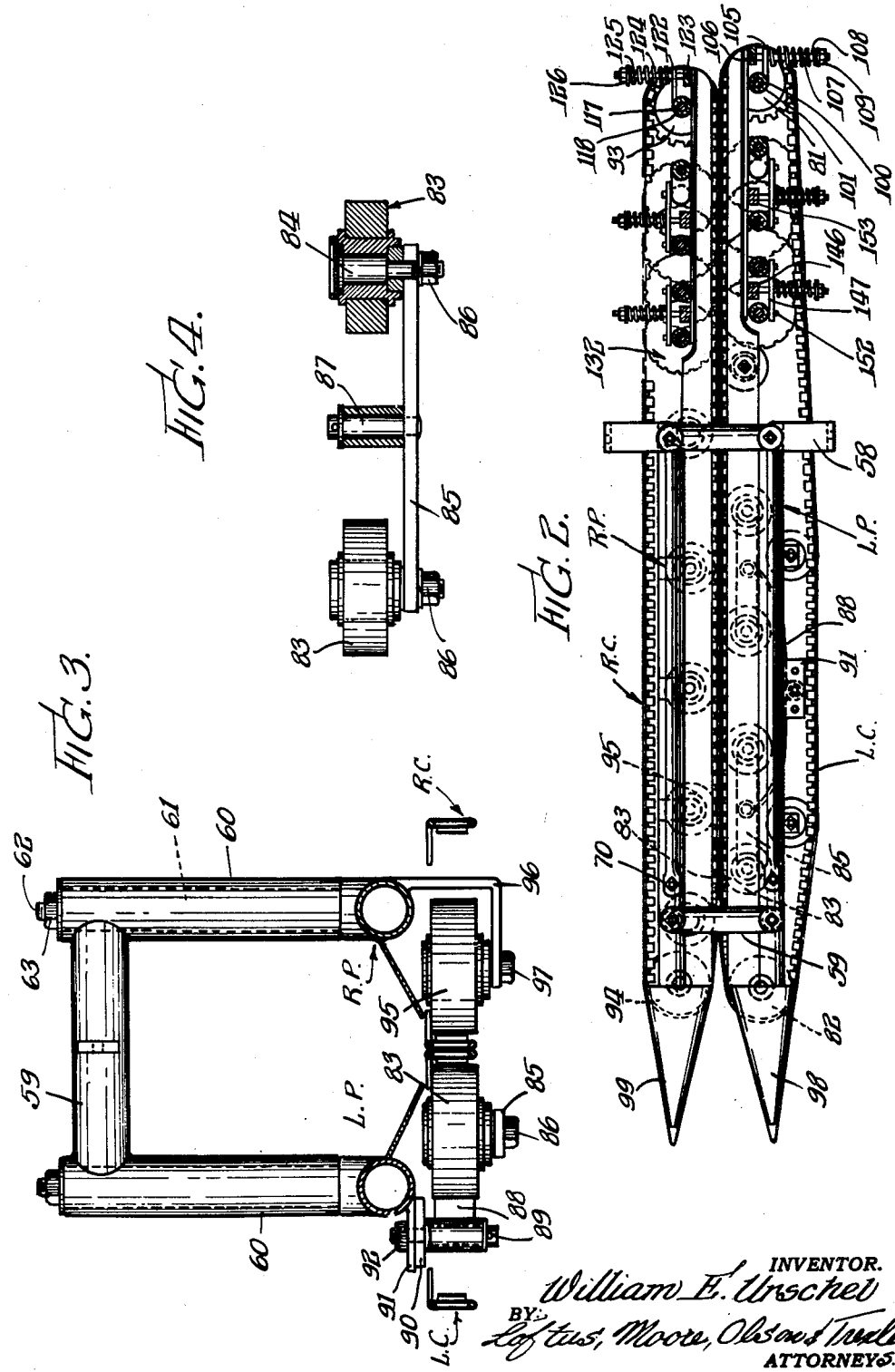

July 19, 1949. W. E. URSCHEL 2,476,336
APPARATUS FOR CUTTING THE TOPS FROM BEETS
Filed April 8, 1943 6 Sheets-Sheet 3
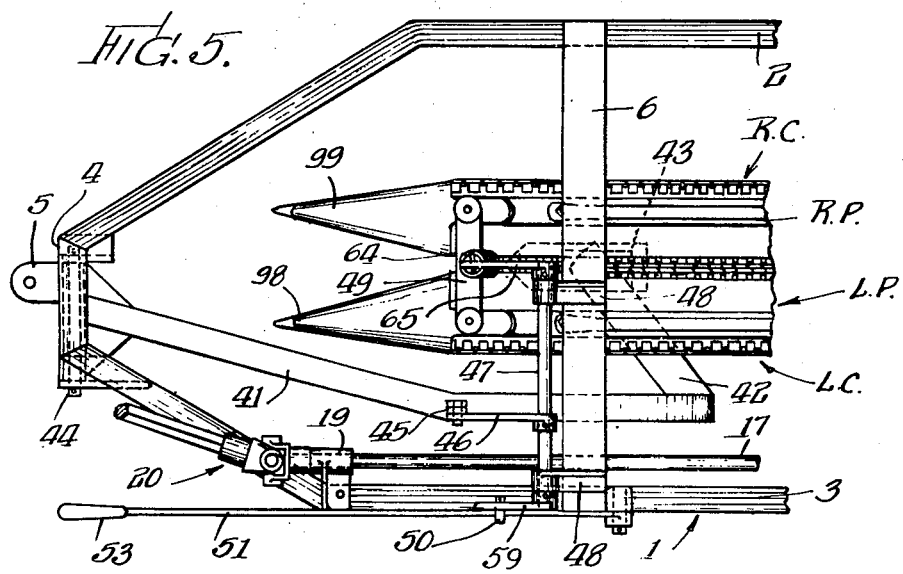
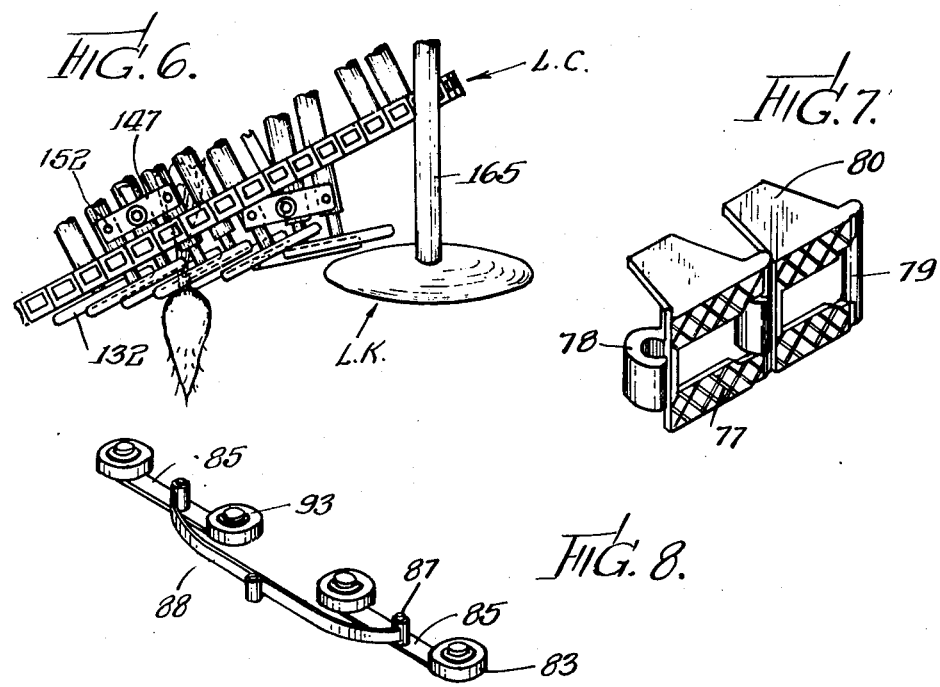
INVENTOR.
William E. Urschel
BY: Loftus, Moore, Olson & Trexler
ATTORNEYS.

July 19, 1949.  W. E. URSCHEL  2,476,336
APPARATUS FOR CUTTING THE TOPS FROM BEETS
Filed April 8, 1943  6 Sheets-Sheet 4
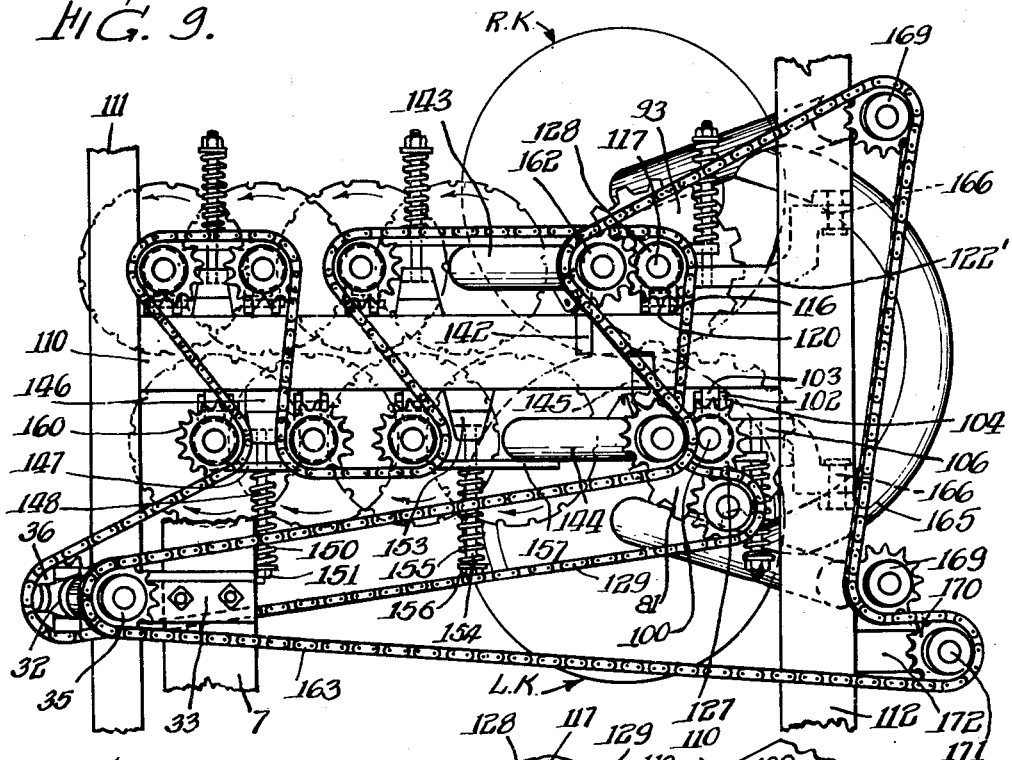
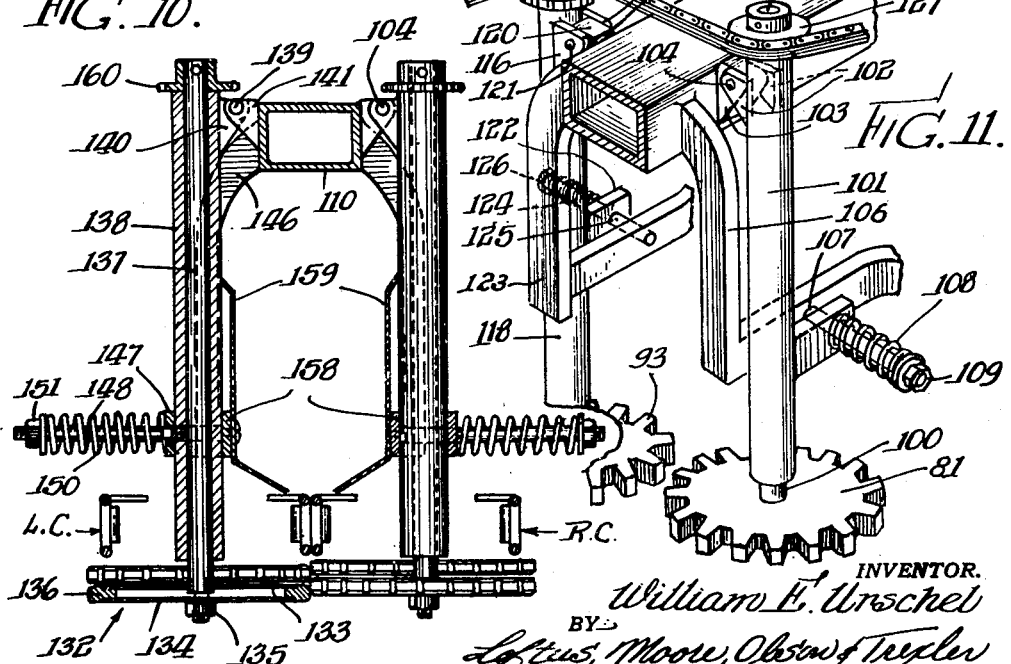
INVENTOR.
William E. Urschel
BY
Loftus, Moore, Olson & Trexler
ATTORNEYS July 19, 1949.  W. E. URSCHEL  2,476,336
APPARATUS FOR CUTTING THE TOPS FROM BEETS
Filed April 8, 1943  6 Sheets-Sheet 5
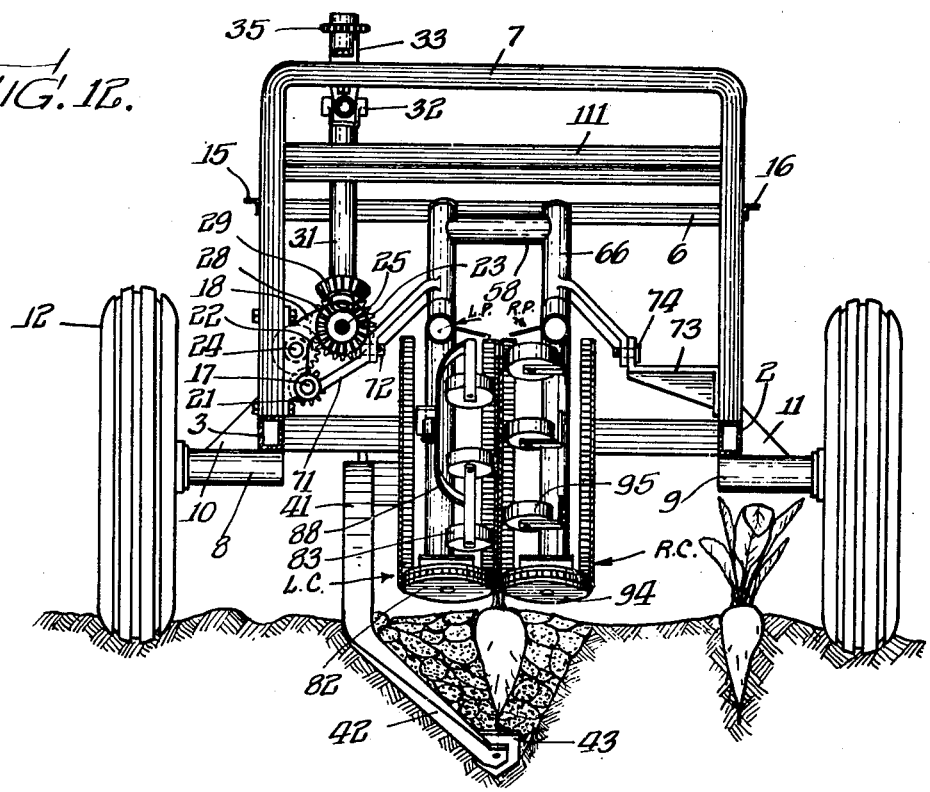
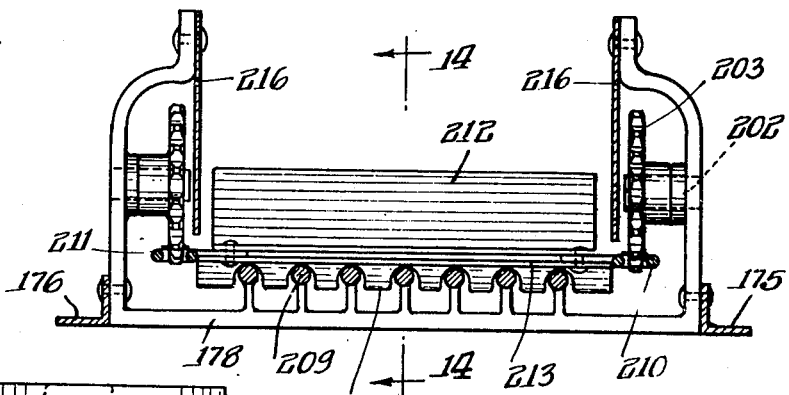
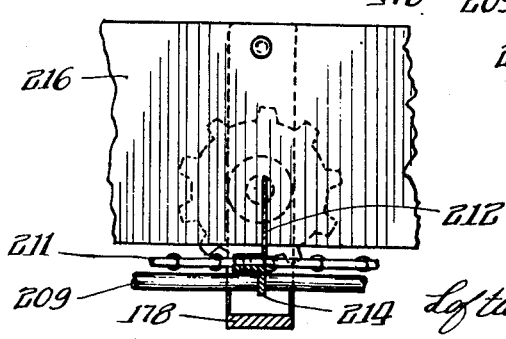
INVENTOR.
William E. Urschel
BY
Loftus, Moore, Olson & Trexler
ATTORNEYS.

July 19, 1949. W. E. URSCHEL 2,476,336
APPARATUS FOR CUTTING THE TOPS FROM BEETS
Filed April 8, 1943 6 Sheets-Sheet 6
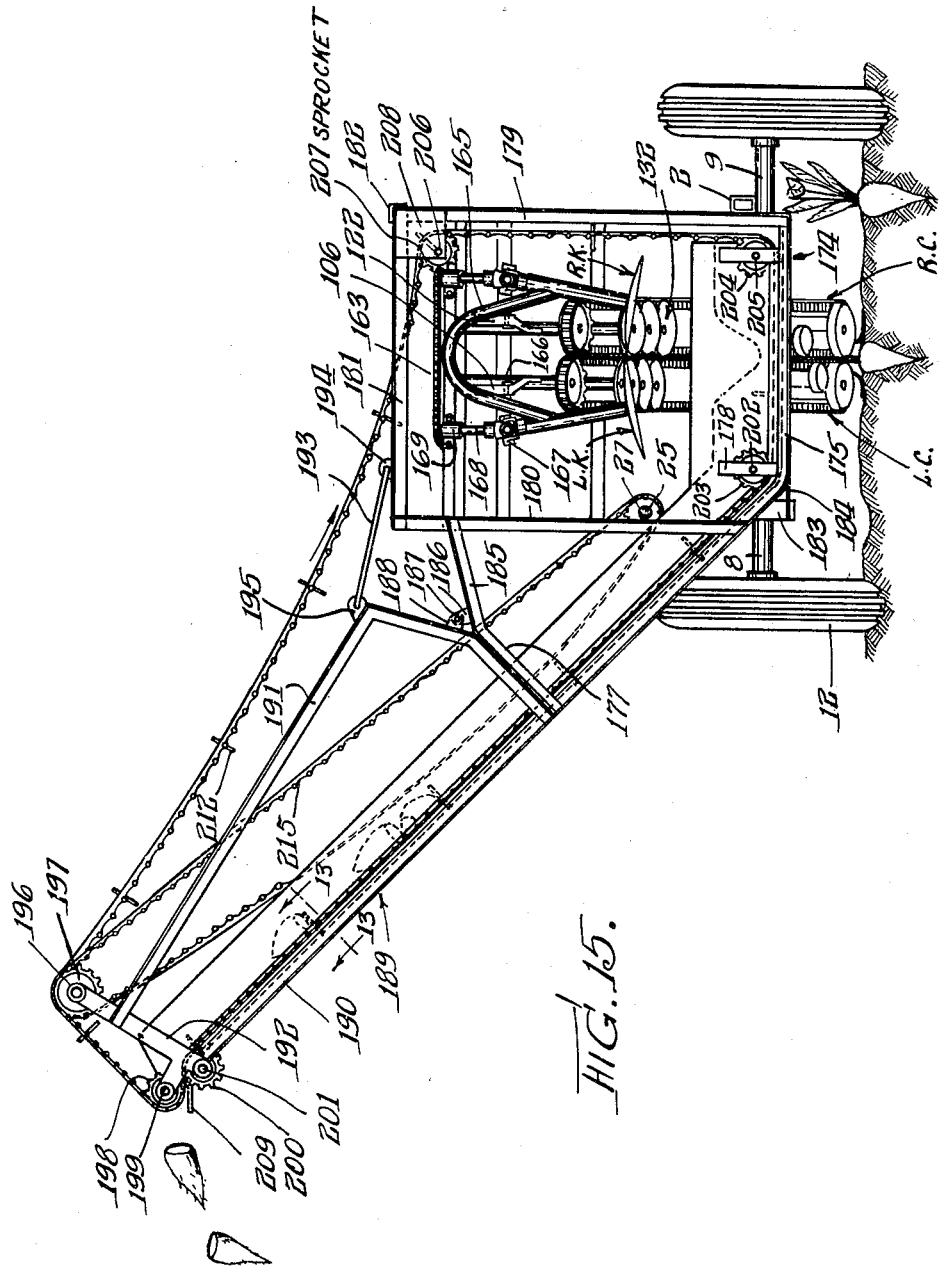

Patented July 19, 1949

2,476,336

UNITED STATES PATENT OFFICE 2,476,336

APPARATUS FOR CUTTING THE TOPS FROM BEETS

William E. Urschel, Valparaiso, Ind.; Joe R. Urschel administrator of said William E. Urschel, deceased Application April 8, 1943, Serial No. 482,227

12 Claims. (Cl. 146—85)

This invention relates to machines for harvesting sugar beets or other crops of similar characteristics. The invention is peculiarly adapted for sugar beets.

Among the objects of the present invention is to provide a means for properly positioning the body of the root crop relatively to cutting means for severing the crown of the root crop wherein the positioning means is constructed so that it can be readily repaired or replaced in the event of a breakdown.

So also one of the objects of the present invention is to provide such a crop positioning means to eliminate binding of the positioning means during operation.

Yet another object of the invention resides in providing crop positioning means which will shift the body of the root crop downwardly in small increments of movement without injuring the crown or top portion of the root crop, and which means at the same time will augment the feed, and in fact will alone feed the crop to the cutting means.

Yet another object of the invention resides in providing an elevator construction for carrying the root crop to a point of discharge wherein means is provided for eliminating mud or dirt which would otherwise tend to pack on the bottom of the elevator and interfere with the free operation of the elevator. Thus the elevator will perform efficiently when the soil is moist or muddy.

So also one of the objects of the invention is to provide an elevator wherein the crop is positively discharged from the elevator with a throwing action whereby the length of the elevator may be reduced and whereby the crop may be caught in a suitable receptacle positioned more remotely from the elevator; to provide these and other objects of invention as will be apparent from the following specification when taken in connection with the accompanying drawings, wherein:

Figure 2 is a plan view of the puller mechanism and the gauge wheel unit with the support for the gauge wheel unit broken away to show the gauge wheels.

Figure 3 is a rear view of the front arch support of the puller mechanism.

Figure 4 is a side view of the idler rollers and an equalizer arm.

Figure 5 is a fragmentary plan view of the front end of the machine.

Figure 6 is a fragmentary side view of the wheel gauge unit.

Figure 7 is a perspective view of two links of the puller chain.

Figure 8 is a perspective view of the leaf spring, equalizer bars.

Figure 9 is a fragmentary plan view of the wheel gauging unit with its support and drive.

Figure 10 is a rear sectional view of the wheel gauge unit taken on line 10—10 of Figure 1.

Figure 11 is a perspective view showing the arrangement of the parts for mounting and the operation of the puller sprockets.

Figure 12 is a rear sectional view of the harvester taken on line 12—12 of Figure 1.

Figure 13 is a cross sectional view taken on the line 13—13 of Figure 15.

Figure 14 is a sectional view of the side of the elevator taken on the line 14—14 of Figure 13.

Figure 15 is a rear elevational view of the harvester.

Figure 1:
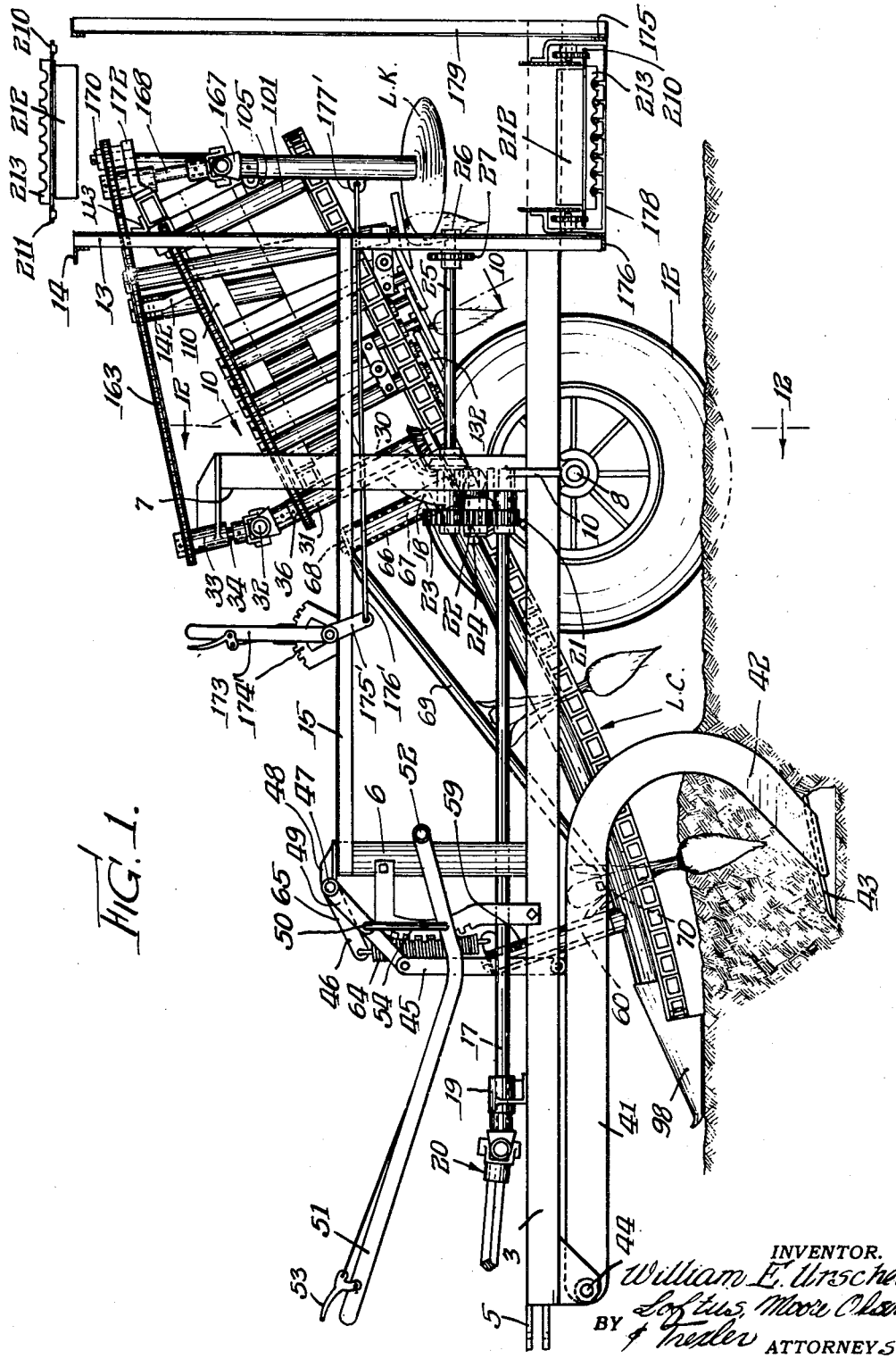
Figure 1 is a side elevational view of the sugar beet harvesting machine with one wheel and a portion of the elevator removed, better to disclose the various parts.

Referring now to the drawings, and particularly to Figures 1, 5 and 12, they show that the machine comprises a main frame which includes two preferably rectangular hollow steel members 2 and 3 arranged in parallelism and having inwardly bent forward portions secured at their ends to a short transverse member 4, see Figure 5. The frame is preferably joined together by welding. Side members 2 and 3 are held in spaced relation by an inverted U-shaped piece 6, see Figure 5, which also serves as a support for the plow, the pullers and controls therefor. As shown in Figure 12, rearwardly of the cross frame 6 is another inverted U-shaped frame 7, welded to the side members 2 and 3. This U-shaped member 7 provides a support for the rear end of the puller frames, the crop positioning means, and also serves to strengthen the frame at the point where the stub axles 8 and 9 are welded to the side frame members 2 and 3. This is clearly shown in Figure 12. The stub axles 8 and 9 are welded to the side members 2 and 3 directly below the point where the legs of the U-shaped member are welded. Triangular braces 10 and 11, preferably of plate steel, are welded between the stub axles 8 and 9 and the side members 2 and 3, to provide a rigid mounting for the ground wheels 12. These ground wheels are rotatably mounted on the stub axles 8 and 9. At the rear end of the side member 3 a vertical angle 13 is welded, see Figure 1. Directly opposite angle 13, and welded to the side member 2, is another vertical angle, not shown, which is joined at its upper end to the upper end of angle 13 by a transverse angle 14. These three angle bars provide a support for the rear end of the crop positioning means, and also for the elevator hereinafter to be described. An angle bar 15 welded to the upper portion of the U-shaped member 16 extends rearwardly and is welded in turn to U-shaped member 7 and vertical angle bar 13. Similarly, another angle iron 16 is welded to the corresponding members on the opposite sides of the frame. These angle bars 15 and 16 act as braces to strengthen the frame. At the front of the frame and welded to the member 4 is a clevis 5 for coupling the machine to the draw bar of a tractor.

The transmission mechanism for the various parts of the apparatus will now be described. A main drive shaft 17 is journaled at its forward end in a bearing bracket 19, see Figure 1, secured to the main frame member 3 and at the rear end is journaled in a bracket 18 which is bolted to the U-shaped member 7. See also Figure 12. This drive shaft 17 is driven by the power take-off shaft of the tractor through the conventional type of universal joint assembly 20. The forward end of this universal joint 20 is secured in the splined take-off shaft of the tractor and the other end is pinned or keyed to the drive shaft 17. Thus rotative power is transmitted to shaft 17 by the tractor which likewise pulls the harvester along the row of sugar beet plants to be harvested. A gear 21 which is keyed to this drive shaft 17 drives an idler gear 22 which in turn is rotatably mounted on a stud 24. This stud is securely fixed in a bearing bracket 18. This idler gear 22 drives a gear 23 keyed to a shaft 25. This shaft 25 is suitably journaled in a bearing which is a part of bearing bracket 18. The rear end of shaft 25 is journaled in a bearing 26 bolted to the vertical angle iron 13. A sprocket 27 is secured on shaft 25 near the rear bearing 26 and provides a drive for the elevator, later to be described. By reference to Figure 12 it will be seen that a bevel gear 28 is secured to shaft 25 adjacent to the bearing bracket 18 and drives a bevel gear 29 which is keyed to shaft 30. This shaft 30 is journaled in a bearing 31 forming a part of the bearing bracket 18. A sprocket 36 pinned to shaft 30 provides a drive for a portion of the crop positioning means and a universal joint 32 pinned to the upper extremity of shaft 30 transmits power to the angularly disposed shaft 34 which is journaled in the bearing bracket 33. This bracket 33 is bolted to the U-shaped frame member 7. On the upper end of the shaft 34 is pinned a sprocket 35 from which is driven the cutting means and a portion of the wheel gauging unit. The drive within the various units will be described later.

A crop harvester is provided to assist the puller mechanism in pulling the embedded crop from the soil. This lifter is arranged to run in the ground under the crop for lifting it and for breaking up the soil about the crop so that the latter may be easily raised from the soil by the pulling mechanism.

Referring now to Figures 1, 5 and 11, the crop lifter is seen to consist of a substantially horizontal beam 41 having at its back or rear end a spur section 42 turned laterally downwardly and forwardly in support of a forwardly directed shovel 43. The beam 41 is pivotally connected at its forward end with the pin 44 carried preferably in the draw bar of the frame. Means is provided for adjusting the depth at which the crop lifter shall be maintained and this consists of a vertical link 45 which at its upper end is pivotally connected with the forward end of an arm 46. This latter arm is fixed upon a cross shaft 47 that is journaled in a plurality of bearing members 48 attached to the U-shaped member 6. A second arm 49 fixed to the shaft 47 is connected by means of a link 50 with an operating lever 51. The latter lever is pivotally connected with the machine frame through a pin 52. The arrangement is such that an operator while in the driving seat of a tractor may grasp the end of the lever 51 which together with the conventional finger grip 53 for releasing the lever 51 from the cooperating segment 54 will then pivot said lever 51 to change the elevation of the lifter or plow shovel 43.

Means is likewise provided for grasping the leafy portions of the soil embedded crop, for gradually pulling the crop upwardly free from the soil, and for conveying the crop to cutting means for severing the crown portion of the crop, and for discharging the severed portion into a conveyor so that the recovered severed crop portions may be disposed at a desired point while the leafy portions and severed crown portions may be discharged at another remote point and free from the machine.

The puller mechanisms comprise right and left puller frames designated RP and LP. These puller frames are supported at their upper or rear ends by a rear arched bracket 58. The puller frames project downwardly and forwardly as shown in Figures 1 and 12. At the lower ends these puller frames are suspended by a front or lower arch bracket 59 which has bearings 60 in which pins 61 are pivotally mounted. These pins 61 are secured to the puller frames LP and RP, as well shown in Figure 3. The pins 61 are retained in proper position in the bearings 60 of the arch bracket 59 by a washer and nut 63 which engages the threaded reduced diameter portions 62 of the pins 61. Thus the arch bracket 59 holds the front or lower end of the puller frames in properly spaced position. This front arch bracket 59 is supported by a helical spring 64 which depends from the free end of arm 65, see Figure 1, and which arm 65 has its opposite end fixed on the shaft 47. This arm 65 is controlled by manually operated lever 51 through a link and an arm 49 connected to shaft 47. By supporting the front end of the puller frames by the spring 64, the lower ends of the puller frames may slide easily over any obstructions and follow the uneven contours of the ground. Extreme clockwise rotation of the hand lever 51 will cause the lower ends of the puller frame members to be lifted entirely clear of the ground into a transporting position.

The rear ends of these same puller frames are supported by the rear arch bracket 58, as shown in Figure 12. This bracket 58 has bearings 66 within which pins 67 are pivotally mounted. These pins 67 are welded to the puller frames. Braces 69 are secured to the upper ends of pins 67 by cap screw 68, and retain the pins in their respective bearings of the arch support 58. The braces 69 project forwardly to the lower ends of the puller frames and are secured thereto by the bolts 70, see Figure 1. This construction strengthens the puller frames.

Referring now to Figure 12, this rear arch bracket 58 is swingable about horizontal axes and to this end is pivotally mounted on the left side on the pin 72 which is secured in the projection 71 of the bearing bracket 18, and on the right side is pivotally mounted on the pin 74 secured in the bracket 73. Said bracket is firmly attached to the U-shaped frame member 7. This construction allows the front ends of the puller frames to move up and down as directed by the hand lever 51, and likewise permits the front ends of the puller frames to move laterally to follow lateral deviations of the row of beet plants in the ground.

From the foregoing description it will be noted that the front pins 61 secured to the puller frames and the two rear pins 67 also secured to the puller frames form the corners of parallelogram. As each of these pins is pivotally mounted in its respective bearings, such construction permits of the lateral movement of the front ends of the pullers, as hereinbefore described.

A puller chain LC associated with the puller frame LP consists of a plurality of chain links 77, each of which has at one end a hook 78 which is connectible with an opposite end section 79 of the adjacent link, as shown in Figure 7. These links are connected into endless chains in such a manner that the flanges 80 are turned inwardly with such flanges 80 at the upper part of the chain. The chain LC is carried upon a driving sprocket 81 and rides about a lower idler wheel 82, journaled in the lower end of the puller frame LP, see Figure 3. As shown in Figures 2, 4 and 8, a plurality of idlers 83 associated with the puller frame for bearing outwardly against the inner side of the working flight of the puller chain LC, and with the exception of the uppermost thereof are arranged in pairs of which the individual rollers are journaled about the vertical pins 84. These pins are secured at the opposite ends of the equalizing arms 85 by the nuts 86. These arms 85 are pivotally supported at the ends of leaf spring 88 by studs 87 pivotally mounted in the bearings at each end of the leaf spring. This leaf spring 88 is pivotally mounted at its center on a stud 89 which is attached to the laterally adjustable plate 90. The plate 90 is attached to the puller frame LP by bolts 92 which pass through slots in the projection 91 of the puller frame. Thus the rollers 83 are yieldingly pressed outwardly against their associated puller chain and the force is differentially applied to such chain because of the pivotal connection of the arms 85 with the ends of the spring 88.

A puller chain RC associated with the puller frame RP similar to the puller chain LC is driven from the sprocket 93 and about the idler roller 94. A plurality of idler rollers 95 associated with puller frame RC are arranged in staggered relation with respect to idler rollers 83. The idler rollers 95 are journaled on studs secured by nuts 97 in brackets 96 which are welded at properly spaced intervals on the puller frame RP.

The puller frames RP and LP have at their lower ends skid shoes for sliding along the surface of the ground to maintain the puller chains in proper position to grasp the leaf portions of the crop. These skid shoes terminate with the pointed portion which guides the leaf portion of the crop between the right and left puller chains.

Means is provided resiliently for urging the rear drive sprockets together. Referring to Figures 1, 2 and 9, the drive sprocket 81 of the left puller is secured to and driven by the shaft 100, which is journaled in the bearing bracket 101. This bearing bracket 101 is supported by a subframe comprised of the front cross member 111 welded between the legs of the U-shaped frame 7, a longitudinal member 110 welded to the center of cross piece 111 and extending rearwardly to another cross piece 112 which is secured between vertical angle 13 and the opposite corresponding angle by clips 113. At the upper end of bracket 101 are the ears 102 which hold the pin 104. This pin is pivotally mounted in the ear 103 which is welded to the subframe member 110. Near the lower end of the bearing bracket 101 is another ear 105 in which a spring rod 107 is reciprocally mounted. The inner end of spring rod 107 is secured to the bracket 116 which extends downwardly from the subframe member 110. A compression spring 108 mounted on the spring rod 107 is secured thereon by the nut 109 which adjusts the tension of the spring 108. In a like manner the sprocket 93 is secured to shaft 117 which is journaled in the bearing bracket 118. The ears 119 hold the pin 121 which is pivotally mounted in the ear 120 (see Figure 11), welded to the subframe member 110. The bearing bracket 118 also has the ear 122 in which the spring rod 125 is reciprocally mounted. The inner end of spring rod 125 is secured in an extension of the bracket 123 which bracket extends downwardly from the subframe member 110. The spring 124 mounted on rod 125 is retained thereon by the nut 126. Thus, the drive sprockets 81 and 93 are urged together, by the springs 108 and 125. As the bearing brackets 101 and 118 are pivotally mounted on the pins 104 and 119 the sprockets 84 and 93 may move laterally against the urge of the springs 108 and 125, to discharge foreign material which may be picked up by the puller chains and to compensate for the varying density of the crop foliage. The puller drive shafts 100 and 117 are driven by sprockets 127 and 128 which are pinned to said shafts at their upper extremities. The sprockets 127 and 128 engage chain 129 which is driven by sprocket 36 on shaft 30, the drive of which has heretofore been described.

Means is provided positively and precisely for positioning the body of the sugar beet relatively to cutting means whereby the cutting means may sever a portion of the crown of the sugar beet. Inasmuch as the sugar beets grow in different positions in the ground, some of them with their crowns projecting upwardly above others, and since the puller frames grasp the foliage portions of the sugar beets and carry the sugar beets upwardly and rearwardly thereby, the crown portions of the sequential sugar beets, as they are carried rearwardly by the conveyor, will be positioned variantly with respect to the conveyor and the crown cutting mechanisms located thereunder. Therefore, means is provided for properly positioning each one of the crown portions of the sugar beets relatively to the crown severing cutters. To this end, mounted below and towards the rear end of each puller chain is the crop positioning means for transferring the crop into predetermined relation with respect to the cutting mechanism. See Figures 1, 6, 9 and 10. This gauging or positioning means comprises a series of rotating, oppositely and staggeredly disposed sets of discs or wheels, each disc of the unit being disposed lower than the preceding disc, and the discs of one set being arranged in staggered relation with the discs of the opposite set. The discs or wheels of the left set for certain conditions may be made of yielding material such as rubber. Referring to Figure 10, the positioning disc 132 has the rubber disc 136 which is clamped between two plates 133 and 134 by the action of a nut 135 on the threaded lower portion of the shaft 137. Round plate 133 is welded or otherwise fastened to the shaft 137. This latter shaft is journaled in the bearing bracket 138 which in turn is hinged to the subframe member 110 by pin 139. This pin is secured in the ears 140 of the bearing bracket 138 and is pivotally journaled in the projection 141 welded to the subframe 110. In a like manner, with the exception of the rearmost bearing bracket, each bearing bracket is hinged to the subframe member 110. By reference to Figures 1 and 6 it will be noted that the rearmost disc of each set of positioning discs has the rear of the disc tipped downwardly towards the disc knives of the cutting means. These last positioning discs are inclined at an angle to the preceding disc in order to present the crop to the knives at such an angle as will obtain a proper cut of the crop. While it is not necessary to set the rearmost disc at an angle with previous discs, experience has shown that a more satisfactory cut is obtained on the crop when the axes of the rearmost discs are more nearly parallel to the axes of the cutter discs LK and RK. If the angle between the positioning discs and the axes of the cutting discs is too great, the body of a small crop is raised upwardly while in the V formed between the two cutting discs and before the cutting edges of the cutting discs contact the body of the crop, the crop will be too high, with respect to the knives, to be cut in the proper place, and thus too much of the body of the small crop will be removed.

The rearmost bearing bracket 143 of the right set of positioning discs is pivotally mounted at its upper end in the bracket 142 which is welded to the subframe member 110. A similar bracket 145 also welded to the subframe member 110 provides a pivotal mounting for the upper end of the rearmost bearing bracket 144 of the left set of positioning discs.

Referring to Figures 9 and 10, a bracket 146 attached to subframe member 110 extends downwardly between the first two bearing brackets 138 of a set of discs. In the lower end of this bracket 146 is secured the spring rod which extends through an enlarged aperture in the central portion of the spring bar 147. At each end of the spring bar 147 are apertures in which rest the studs 152 which are screwed in the lower end of bearing brackets 138. A spring 150 adjustably retained in spring rod 148 by nut 151 urges the spring bar 147 against the brackets 138. As the apertures in the spring bar 147 are slightly larger than the diameter of the studs 152 to permit misalignment of the studs in their respective apertures, this construction is satisfactory. Thus, being pivotally mounted at the top and spring inwardly urged at the bottom, the bearing brackets 138 allow lateral movement of the discs 132 to compensate for the varying thickness of the foliage of the crop and to pass through any foreign material picked up by the machine. Similarly, a bracket 153 extends downwardly from subframe member 110 between the last two bearing brackets of the left set of discs to hold spring rod 154 on which spring bar 157 is mounted. The spring bar is urged against the bearing brackets by the spring 155 which is adjustably retained on the spring rod by the nut 156. Inward movement of the brackets 138 is limited by the bar 158 which is secured to the lower ends of the brackets 146 and 145.

The bearing brackets of the right set of discs are also inwardly spring urged in an identical manner as the left side and will not need further description to be clearly understood. Shields 159 bolted to the bars 158 confine the foliage of the crop in its proper path.

At the uppermost end of each of the drive shafts 137 of the discs, except for the rearmost disc of each set, are pinned sprockets 160 which engage the chain 129 in such a manner as to receive proper rotation as shown in Figure 9. The rearmost discs' drive shafts have pinned at their upper extremities sprockets 162 which engage the chain 163. Said chain is driven by sprocket 35 on shaft 34, as heretofore described.

When viewed from above, as in Figure 9, the discs of the left set have a clock-wise rotation and the discs of the right set when viewed from above have a counter-clockwise rotation. As each crop article is moved upwardly and rearwardly relatively to the machine between the opposite working flights of the puller chains RC and LC a section of the crop foliage will be carried between the opposed sets of positioning discs whereupon the discs will engage the foliage of the crop and assist the puller chains in carrying the crop rearwardly while simultaneously each disc grips the foliage lower than the preceding disc until the body of crop is contacted by the discs, on further rearwardly movement of the crop, each succeeding disc pushes the crop lower until every crop article will be presented to the cutter discs LK and RK in such a position that a predetermined amount of the crop adjacent to the foliage will be removed by the cutter mechanism.

While the discs illustrated are made of a yielding material such as rubber, the discs on one side may be made of metal or other unyielding material. Also, for some crops it might be desirable to make all the discs of metal. Notches may be provided in the periphery of the discs to give them a better grip on the foliage of the crop. Also the number and thickness of the discs may be varied to suit various conditions and crops.

The cutting mechanism which is comprised of the two rotary cutting discs RK and LK is mounted to the rear of and partly under the rearmost gauging wheel. See Figures 1, 9, and 15. The disc knives LK and RK are secured to their respective drive shafts which are journaled in the arch bracket 165. Said arch bracket is pivotally mounted on pins 166 which are secured in bracket 106 on the left side and bracket 122' on the right side. The brackets 106 and 122' extend downwardly from subframe member 110 to which they are attached. At the upper extremity of each knife drive shaft is secured a universal joint 167 which in turn is secured to the vertical shaft 168 journaled in the bearings 169. These bearings 169 are bolted to the subframe member 112. At the upper end of each shaft 168 is pinned the sprockets 169 which engage the chain 163. To guide the chain 163 in a position to drive the knife in the proper rotation an idler sprocket 170 is rotatably mounted on a stud 171, secured in the bracket 172 which is attached to the subframe member 112. By providing the universal joint in the drive of the disc cutters, the arch bracket 165 may be pivoted about the pins 166 to vary the amount of the body of the crop which is cut away with the foliage. The position of the cutters is controlled by a conventional type hand lever 173 with its co-acting segment 174' which is mounted on the frame angle 15. The hand lever 173 has the arm 175' which is connected to the arch bracket ear 177' by the linkage 176.

When the crop is severed by the knives LK and RK, it will fall into the receiving section 174 of the crop elevator mechanism for carrying the crop upwardly and laterally with respect to the machine and discharging the crop into an accompanying receiver such as the box of a wagon or truck. The elevator mechanism has a frame 174 of which the lower position comprises a pair of similar shaped front and back frame members 175 and 176 held in spaced relation by a plurality of rod holders 178, as shown in Figure 13. The forward elevator frame member 176 is secured to the vertical main frame angles 13 and its opposed mate. The rear elevator frame member 174 is secured to the vertical angle 179 welded to the rearmost portion of the main frame member 2 and to the extension 183 which is welded to the main frame member 3. A strap member 184 joins the elevator frame member 175 to the frame extension 183. A vertical angle 180 welded to the elevator frame angle 175 extends upwardly and is joined to the vertical angle 179 at the upper position by the transverse angles 181. The front and rear elevator frame members may be joined together by a suitable number of cross members such as angle 182. A bent angle member 185 welded to elevator frame member 175 and the upright angle 180 acts as a brace for elevator frame member 175. A similar bent angle is welded between the elevator frame member 176 and the vertical frame angle 13. A frame extension member 189 is detachably connected with and extends upwardly from the left side of the frame 177. The rear side of the frame extension 189 is formed by the angle 190 and the formed angle 191, joined at their upper ends by the bracket 192. The front side of the frame 189 is formed by a similar arrangement having members which correspond to the angle 190, the formed angle 191 and the bracket 192. A pair of ears 188 on the inner end of the extension 189 overlaps mating ears 186 on the left side of the frame 177 and pin 187 is disposed mutually within apertures in these ears to provide a connecting means between the frame 177 and the extension 189. Additional connecting means is provided by the links 193 disposed in the ears 194 of the frames 177 and in ears 195 of the extension 189. The rods 193 and the pins 187 are easily removed when it is desired to disassociate the extension 189 from the frame 177 to render the harvester more easily transportable.

A pair of bearing brackets 192 respectively attached to the upper end of the front and back sides of the frame extension, as shown in Figure 15, provides bearings for the elevator drive shaft 196 which has sprockets 197 fixed thereon adjacent to each of its ends. To guide the elevator chain in its proper path, the following sprockets are provided in lateral alignment with the drive sprocket 197; sprocket 198 rotatably mounted in stud 199 secured in the bracket 192, sprocket 200, journaled on stud 201 also secured in bracket 192, sprocket 203 journaled on stud 202 fixed in the rod holder 178, as shown in Figure 13, sprocket 204 on stud 205 secured on another rod holder 178, and sprocket 207 journaled on stud 206 attached to the plate 208 which is welded to the angles 181 and 179. The elevator frame also carries sprockets respectively coaxial with said sprockets 198, 200, 203, 204, and 207, disposed adjacently to the front side of the elevator frame and in lateral alignment with the frontmost of the sprockets 197.

The bottom or floor of the elevator is formed by a plurality of rods 209 disposed parallel with the elevator frame and held in position by a plurality of rod holders 178, as shown in Figure 13. A sufficient number of these rod holders are used to hold the rods in proper position. The rods 209 are spaced sufficiently apart to permit dirt dislodged from the crop to fall between the bars, thus separating any loose dirt from the crop.

The elevator belt is made up of a chain 210 rotated in the direction shown in Figure 15 about the sprockets 197, 198, 200, 203, 204, and 207, and another chain 211 similarly carried on the sprockets arranged coaxially with the just recited sprockets. Carried between and by the two elevator chains 210 and 211 are a plurality of elevator slats or partition members 212, which on movement of the elevator chain contact the crop after it drops from the cutter LK and RK 174 onto the rods 209 and push the crop upwardly along on top of the rods 209. The elevator slats 212 have a lower section 213 from which fingers 214 project between the rods 209. As the elevator slats 212 move along on top of the rods 209, the fingers 214 will remove any mud or trash which tends to collect on the rods 209, thus assuring free operation of the elevator when the soil is moist or muddy.

On the frontmost end of the elevator drive shaft 196 is pinned a sprocket, not shown, which engages the elevator drive chain 215. This drive chain is driven by sprocket 27 on shaft 25, the drive of which has heretofore been described.

Side plates 216 secured to the rod holders 178, as shown in Figure 13, retain the crop within the elevator.

Referring to Figure 15, it will be seen that as the crop is being discharged, the elevator chains are beginning to wrap about the idler sprocket 200 and the coaxially disposed mating sprocket. Due to the fact that the elevator slats 212 travel about the center of the sprocket at a greater radial distance than the pitch diameter of the elevator chains, an increased velocity will be imparted to the elevator slats. Thus, the elevator slats will discharge the crop from the elevator between the front and rear elevator chains with a throwing action.

In operation, the present machine is pulled down the row of crop by any suitable tractor. The clevis 5 on the front end is hinged to the draw bar of the tractor and the machinery of the harvester rotated by the power take-off shaft of the tractor through a universal joint assembly 20 which is attached to the drive shaft 17 of the machine. The harvester is pulled down the row of crop so that the line where the puller chains RC and LC come together is in direct registry with the crop row. As the harvester advances down the crop row, the foliage of the crop is engaged between the endless puller chains RC and LC which exert an upward pull on the foliage of the crop. Meanwhile the crop is loosened and pushed from the soil by the lifter shovel 43. As the crop is lifted from the soil it is carried rearwardly and upwardly with respect to the machine by the puller chains until the foliage reaches the positioning discs whereupon these discs begin operation on the crop.

It has been found that the top of the crop projects various distances above the surface of the ground, some of the crop being substantially buried in the ground while others in the same crop row will project a considerable distance above the surface of the ground. Due to this condition, the foliage of the crop will be engaged by the puller chains at various heights above the body of the crop. To ensure that each crop will be uniformly severed at its upper end, the discs position the crop being conveyed rearwardly by the puller chains in such a manner that the tops of crops will all be in the same plane. As the foliage of the crop passes between the discs, each disc engages the foliage at a point closer to the body of the crop which action continues until the top of the crop is in abutting relation to the lower surface of a disc whereupon on further movement of the crop through the discs, the crop will be pushed downwardly until it is in position to be carried through the abutting edges of the oppositely disposed cutters RK and LK. The puller chains at the rear end of the pullers above the discs must be adjusted to hold to the foliage of the crop lightly enough to permit the foliage to slide transversely in the puller chains when so urged by the discs to prevent breaking the foliage of the crop before the crop is presented to the cutters. After the crop is brought in abutting relation to the lower surface of a disc, the succeeding discs continually regrip the foliage which action tends to gather in the loose foliage. The discs, while positioning the crop transversely to the puller chain, also aid the puller chain in carrying the crop rearwardly. After the upper end or crown of the crop is in abutting relationship to the lower surface of the rearmost disc, the crop is carried rearwardly between the cutter discs RK and LK which sever the foliage and the crown or top portion of the crop from the body of the crop. When severed from the foliage the body of the crop falls into the elevator and the foliage is discharged from the machine by the puller chains.

With reference to the crop positioning means it will be noted that it is a sort of gauging mechanism for leveling up the crowns of the beets, preparatory to removing the foliage and the crowns. In this unit the beets travel in a predetermined path and are guided on both sides by the oppositely disposed, staggeredly arranged, discs which are held in proper positions by the tension springs. These discs thus hold the grasped foliage under tension while at the same time the discs position the body of the beet successively downwardly until it is properly positioned with respect to the cutting discs.

It will be noted that the gauging or positioning unit is composed of two rows of rotating discs which overlie each other in the row so that the discs in each row register in staggered relation with the discs of the opposing row. It will be further noted that this predetermined path formed by the discs is not even in width, but is wider at certain points, for instance at points where three of the discs are equal distances from each other, and at these points there is but little gripping on the foliage by the discs, which lessened gripping allows the body of the beet a freer action to slip down to its proper position. At the same time the grip of the chains is not of sufficient tension to interfere with this downward positioning movement caused by the discs abutting the curved crowns o' the beets. In this connection, at these zones of wider spacing between the discs, the momentum of the travel of the beet as it is urged forwardly by the discs will carry the beet along so that it will enter the adjacent narrow portion of the pathway where it will again be grasped by the two succeeding spaced apart discs and carried along in a continuous movement. In this connection it is to be noted that the harvester is pulled about three miles per hour and the beets travel back in the machine at the same speed which is about 4.4 feet per second. Beets pass through or by the whole set of positioning discs 132 in one third of a second. It is therefore necessary to consider what happens to a beet in that one third of a second. The beet is hit first on one side and then on the other, in succession. The beets vibrate an instant as they pass through the stepped discs, and then off comes the crown of the beet as it passes between the opposed cutters, all taking place in less than a half a second. The puller chains above, move the beet tops at the same rate of speed as the discs 132 do. The puller chains serve two main purposes as they carry the tops over the positioning discs in that they help to hold up the beets and also help to discharge the tops to the rear. The momentum of the beets traveling at this speed prevents them from dropping downwardly when the foliage comes to the wider spaces between the discs. As the beet passes between the discs each disc will successively contact the foliage a little further down in a direction toward the crown and then as the succeeding discs contact the crown on opposite sides of the crown the root crop of the beet will be alternately depressed on either side of the crown whereby to force the beet down with a sort of alternate bobbing action as it passes between the various successively positioned discs located on opposite sides of the path of travel of the beet.

By locating the discs on opposite sides of the path of the beet in staggered relation, certain forward feeding of the beet by the discs is assured, and by arranging the discs in stepped relation, smaller increments of downward push are imparted to the crown of the beet whereby greater preciseness in positioning the beet with respect to the line of cut of the disc knives may be attained, and further, less harm can possibly come to the beet due to any possible pinching action that the opposed discs may have upon the crown of the beet.

One of the important advantages of this type of beet positioning device resides in the fact that these discs could be considerably worn and still work efficiently. Furthermore, an ordinary blacksmith in a farm community can repair these discs quite easily.

Another advantage resides in the fact that the disc action prevents the bruising of the main crops, be they sugar beets or gladioli bulbs or any other type of root adaptable for operation by this machine.

My present invention, using a series of relatively thin, overlapping, stepped discs possesses many advantages over my prior Patent 1,905,194 showing the use of overlapping gauge chains operating in pairs, which requires a number of sprocket wheels and chains. Sugar beet tops have a sweet juice in them which gets squeezed out onto accumulating soil on the chain and on everything else, and sugar beet farmers are very reluctant to use a harvester which requires continuous cleaning. My present invention, utilizing the positioning discs, provides a construction which stays substantially clean. Furthermore, the discs are much thinner than the chains of my prior invention, and being so much thinner, are not as severe on the beets when shifting them to different positions. The soil-covered beets are continually bringing gritty soil to the overlapping gauge chains and the chains therefore unnecessarily wear out and are relatively short lived. Furthermore, in the present invention, using the discs, the beets move so fast that they have no time to drop before they are given a forward impetus by the next succeeding opposed set of discs.

It is thought that the invention and numerous of its attendant advantages will be apparent from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

The invention is hereby claimed as follows:

1. A beet harvester comprising conveying means for the beet plants, said conveying means having gripping surfaces for engaging the leafy portions of the beet plants for conveying the beets thus suspended by said leafy portions, along a predetermined path, series of rotating, flat, substantially thin discs disposed in stepped overlapping arranagement on opposite sides of and longitudinally of the path of travel of the beets while being conveyed along said path by said conveying means, the discs of one series being arranged in staggered relation with respect to the discs of the opposite series in order to cause the discs to propel the plant therebetween and for enabling the discs to progressively downwardly shift the position of said roots in said conveying means, and means in association with said discs for severing said beets from said tops.

2. A beet harvester comprising conveying means for gripping and suspending beets by their leafy portions for conveying the beets along a predetermined path, rotatable discs on each side of said path and disposed in overlapping relation longitudinally of the path of travel of the beets for engaging the beet roots and for moving the beets in a direction downwardly of said conveying means for positioning the crowns of the beet roots, the discs on one side of the path being arranged in staggered relation with respect to the discs on the opposite side of the path.

3. A beet harvester comprising means for gripping the leafy portions of beets for conveying the beets along a predetermined path, opposed sets of oppositely rotating discs disposed at each side of said path of travel of said beets for engaging the beet roots and for moving the beets transversely of said conveying means, the discs of each set being arranged in overlapping relation and the discs of the opposed set being arranged in staggered relation and the discs in each set being dispose lower and lower in the direction of movement of the beets conveyed by said conveying means whereby progressively to move the beets transversely of said conveying means.

4. A beet harvester comprising means for conveying beets along a predetermined path and relatively flat discs at each side of said conveyor and disposed on opposite sides of said conveyor and longitudinally of said conveyor, means for rotating said discs on opposite sides of said path in a direction to assist the feeding action of said beets in the direction of travel imparted to said beets by said conveying means, said discs being disposed in parallel overlapping relation to each other, and said discs lying in progressively lowered parallel planes as said beets are conveyed by said conveying means, and a final set of discs disposed on opposite sides of the conveyor and disposed at an acute angle to the last of the parallel set of discs, and severing discs adapted to sever the crowns of beets positioned by said angularly disposed discs.

5. A beet harvester comprising means adapted to grip the leafy portions of the beets to convey them along a predetermined path, oppositely rotatable discs disposed below and on opposite sides of an intermediate portion of said conveying means and longitudinally thereof for grasping the leafy portions of the conveyed beets at points below the portions thereof grasped by said conveying means, said discs being disposed in parallel overlapping relation, each succeeding disc underlying the next preceding disc in the direction of the length of the conveyor from front to back, whereby to move the beets downwardly as they are fed along the path of travel of the conveying means, crown severing means associated with the rearmost of said discs, said conveying means extending beyond the zone of action of said severing means whereby to carry the severed leafy portions and crowns away from said severing zone.

6. A beet harvester comprising means for gripping the leafy portions of beets for conveying them along a predetermined path, a plurality of relatively flat discs disposed in substantially parallel staggered relation on opposite sides of and longitudinally of the path of travel of the conveying means, certain of said discs having rubber gripping faces, means for rotating said discs, said discs being disposed in overlapping substantially vertically stepped relation to engage the crowns of said beets and lower the same transversely of the path of travel of said beets, severing means disposed at the end of said discs for severing the crowns of said beets, and means for rotating said sets of discs whereby to assist in the longitudinal feed of said beets along the path of travel of said conveying means.

7. A beet harvester comprising means for gripping the leafy portions of beets for conveying the same along a predetermined path of travel, and opposed stepped series of rotary discs disposed in staggered relation on opposite sides of the path of travel of said beets for alternately engaging the opposite diametrical sides of beets as they are carried along by said conveying means for pushing the beets downwardly with respect to said conveying means in increments of movement whereby to lower the position of the crowns of said beets to a predetermined position.

8. A beet harvester comprising means for gripping the leafy portions of beets for conveying the same along a predetermined path of travel, opposed, elongated series of relatively thin rotary discs disposed in stepped overlapping relation on opposite sides of said path of travel, the discs of one series being staggered relatively to the opposite series whereby successively to engage opposite sides of the crown of the beet as it is conveyed by said first mentioned conveyor for progressively pushing down on said beets to lower them to predetermined position as they travel, and severing means for severing the crowns of the beets.

9. A conveyor suspending root crops comprising travelling members for gripping the leaves of the root crops therebetween and for conveying the same along, cutting means in the path of said conveyor, crop positioning means comprising elongated sets of overlapping flat discs disposed on each side of the path of suspended crops and below the travelling members and in front of the cutting discs, means for mounting the discs of each set so that said discs are in staggered relation with respect to the discs of the opposite set in a direction longitudinally of the path of travel of the crop while conveyed by the travelling members whereby to provide a continuous space between the discs of opposed sets, which space is alternately narrow and then relatively wider, and through which space the leaves of the suspended crop pass, and means for oppositely rotating said discs whereby to cause the discs to alternately first grip and forwardly propel the leaf portion and root crop of the beet in the same direction as the root crop is propelled by the travelling members, and for thereafter relatively releasing the grip on the leaves of the beet and for ultimately causing the crown of the beet to contact the underside of the rotating cutting discs to position the crown of the beet at a predetermined location with respect to the zone of action of the cutting discs whereby to top the crown of the beet.

10. A beet harvester comprising a pair of upwardly inclined, endless conveying members adapted to grip the leaves of a beet therebetween to convey the beet along an upward path with the root of the beet below the conveying means, a series of parallel rotating discs disposed in stepped relation on each side of the path of travel of the beet, said discs being relatively flat and circular, the discs of each series being disposed in staggered relation on opposite sides of the path of travel so as to provide an irregular elongated opening between the opposed sets of discs through which the leaf portion of the crop is adapted to travel with the root portion of the crop underlying said discs.

11. A beet harvester comprising a pair of upwardly inclined, endless conveying members adapted to grip the leaves of a beet therebetween to convey the beet along an upward path with the root of the beet hanging below the conveying means, a series of parallel rotating discs disposed in stepped relation on each side of the path of travel of the beet, said discs being relatively flat and circular, the discs of each series being disposed in staggered relation on opposite sides of the path of travel so as to provide an irregular elongated opening between the opposed sets of discs through which the leaf portion of the crop is adapted to travel with the root portion of the crop underlying said discs, and cutter means disposed opposite the rearmost discs of the two sets for cutting the crown of the beets properly positioned by said discs as said beets are conveyed.

12. A beet harvester comprising a pair of upwardly inclined, endless conveying members adapted to grip the leaves of a beet therebetween to convey the beet along an upward path with the root of the beet below the conveying means, a series of parallel rotating discs disposed in stepped relation on each side of the path of travel of the beet, said discs being relatively flat and circular, the discs of each series being disposed in staggered relation on opposite sides of the path of travel so as to provide an irregular elongated opening between the opposed sets of discs through which the leaf portion of the crop is adapted to travel with the root portion of the crop underlying said discs, the last pair of discs being disposed at an angle to the remainder of the discs, and a pair of cutters disposed with their axes of revolution disposed substantially parallel to the axes of revolution of the last mentioned discs and adjacent the end of the path of travel formed by said discs to sever the crowns of the beets when positioned by the discs being conveyed.

WILLIAM E. URSCHEL.

REFERENCES CITED

The following references are of record in the file of this patent:

UNITED STATES PATENTS

| Number | Name | Date |
|---|---|---|
| 160,945 | Ockershausen | Mar. 16, 1875 |
| 566,793 | Parsons | Sept. 1, 1896 |
| 621,744 | Bowden | Mar. 21, 1899 |
| 833,456 | Goodfellow | Oct. 16, 1906 |
| 1,028,797 | Stromberg | June 4, 1912 |
| 1,041,003 | Binder | Oct. 15, 1912 |
| 1,405,885 | Woodson | Feb. 7, 1922 |
| 1,442,963 | Moore | Jan. 23, 1923 |
| 1,568,594 | Flint | Jan. 5, 1926 |
| 1,723,591 | Watkins | Aug. 6, 1929 |
| 1,905,194 | Urschel | Apr. 25, 1933 |
| 1,964,896 | Urschel | July 3, 1934 |
| 2,056,286 | Morgan | Oct. 6, 1936 |
| 2,074,677 | Urschel | Mar. 23, 1937 |
| 2,183,631 | Urschel | Dec. 19, 1939 |
| 2,230,139 | Gustin | Jan. 28, 1941 |

FOREIGN PATENTS

| Number | Country | Date |
|---|---|---|
| 317,825 | Great Britain | 1930 |